J. F. WOLLENSAK.

TRANSOM LIFTER.

No. 10,264. Reissued Dec. 26, 1882.

Inventor:
John F. Wollensak

Attest:
Hyram Smith
Thomas A. Banning

N. PETERS. Photo-Lithographer. Washington, D. C.

UNITED STATES PATENT OFFICE.

JOHN F. WOLLENSAK, OF CHICAGO, ILLINOIS.

TRANSOM-LIFTER.

SPECIFICATION forming part of Reissued Letters Patent No. 10,264, dated December 26, 1882.

Original No. 148,538, dated March 10, 1874. Application for reissue filed May 31, 1882.

*To all whom it may concern:*

Be it known that I, JOHN F. WOLLENSAK, of Chicago, in the county of Cook and State of Illinois, have invented certain new and useful Improvements in Transom-Lifters; and I do hereby declare the following to be a full and exact description of the same, reference being had to the accompanying drawings, forming part of this specification, in which—

Figure 1:
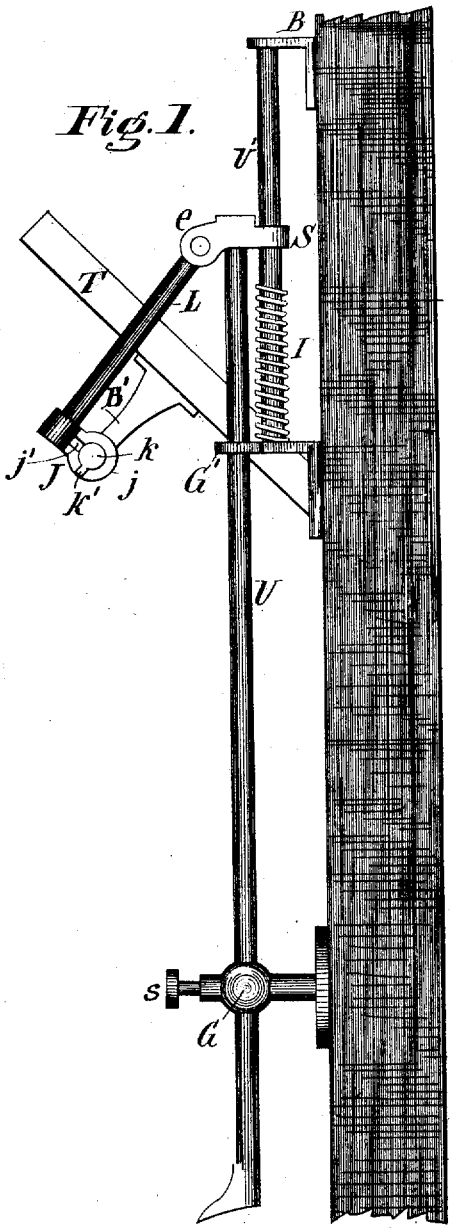
Figure 2:
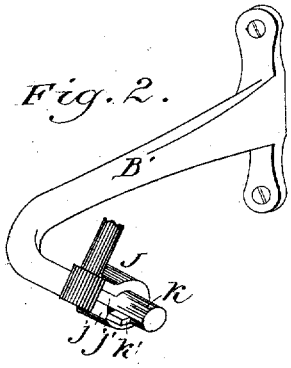
Figure 3:
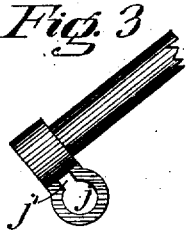

Figure 1 is a side elevation, and Figs. 2 and 3 views of parts in detail.

Similar letters of reference in the accompanying drawings denote the same parts.

This invention is an improvement upon my patent dated March 11, 1873, No. 136,801, in which provision was made against the bending of the long upright rod or handle of the transom-lifter by the weight of the sash at the point where it was jointed to the lifting-arm connected to the side or edge of the sash, this being accomplished by prolonging the upright rod above the point of junction of the lifting-arm and providing said upright rod with a friction-roller at the point of junction, said roller bearing against the wall and helping to sustain the weight of the sash.

The object of the present invention is to provide means for supporting the upright rod against the bending pressure of the sash when the latter is hinged at its bottom, and at the same time prevent the breakage of glass in the transom in case the latter is allowed to fall suddenly.

It also has for its object to provide improved means for connecting the lifting-arm to the transom.

To these ends the invention consists, first, in jointing the lifting-arm to its operating rod or handle at the upper end of the latter, and in providing the operating rod or handle with a socket at or near its junction with the lifting-arm, said socket sliding on a stationary upright rod attached to the wall; secondly, in interposing a spiral spring on the stationary rod between the sliding socket and the upper guide-bracket of the operating-rod in such manner as to sustain the weight of the sash when it is lowered, and prevent any sharp concussion when the transom falls suddenly; and, finally, in a bayonet-joint connecting the lifting-arm to the bracket on the transom, said joint being formed by a tongue on the end of the bracket and a corresponding slot in the socket on the arm, the parts being so arranged that they cannot be disconnected in any part of the arc described by the transom when the lifting-arm is attached to the operating-rod, all of which I will now proceed to describe.

In the drawings, T is the transom-sash, pivoted or hinged in the present instance at its lower edge; L, the lifting-arm, that connects the sash to the upright rod; U, the upright rod, passing through two guides, G G′, both of which are located below the junction of the rods L U, the guide G being provided with a set-screw, *s*, arranged to hold the rod U at any point desired. The upright rod U, instead of being prolonged at its upper end above its junction with the lifting-arm, as in my former patent, terminates at that point, and is provided at the front with ears *e*, to which the lifting-rod is pivoted, and at the rear with a socket, S, which incloses and slides upon a stationary upright rod or long guide, U′. The latter is supported at its lower end below the socket S by the bracket composing the guide G′ of the rod U and at its upper end by a bracket, B.

I represents a spiral spring, inclosing the rod U′ between the socket S and the guide G′.

B′ is a reversible bracket on the transom-sash, adapted to be inserted from either side of the socket on the lifting-arm L. It will be seen that the weight of the sash is supported equally by the rods U U′ and their brackets, and cannot bend either. When the sash is lowered until the socket S comes in contact with the upper end of the spring I its weight is sustained by the latter vertically. Consequently when the sash is allowed through carelessness to fall suddenly the spring relieves the shock which would otherwise occur, and prevents damage to the glass. The lifting-arm L is attached to the bracket B′ of the transom-sash by a bayonet-joint, J, the end of the arm having a socket, *j*, with a slot, *j′*, and the bracket having a pin or bearing, *k*, with a tongue, *k′*, adapted to enter the socket and its slot when the tongue and slot are in line. The latter parts are so arranged, however, that they cannot come in line in any portion of the arc described by the bracket B′ in the operation of the transom, so that the arm and bracket cannot be disconnected while in working position.

The advantages resulting from these improvements are obvious, the spring guarding against any liability of breaking the glass, and the joint facilitating the connection of the lifting-arm to the bracket of the sash.

In heavy transoms I propose to employ the devices described at each end of the sash, making it doubly secure against accident.

Having thus described my invention, what I claim as new is—

1. The stationary upright rod U′, supported by brackets G′, B, and provided with a spiral spring I, in combination with the movable upright rod U, having the socket S, arranged at or near the junction of the rod U, and lifting-arm L, substantially as described, for the purpose specified.

2. The lifting-arm L, having the socket *j* and slot *j′*, in combination with the transverse bracket B′, having the pin or bearing *k* and tongue *k′*, arranged and operating substantially as and for the purpose specified.

3. The combination, with a transom-window, of the bracket B′, lifting-arm L, long guide U′, and lifting-rod U, having sliding connection with guide-rod U′, all substantially as described, and for the purposes set forth.

4. The combination, with a transom-window and its vertical lifting-rod, of a long stationary guide and support for the upper end of the vertical lifting-rod, by which the latter is held to a rectilineal path through suitable connections, substantially as described, and for the purposes set forth.

5. The combination, with a transom-window, of the separate guide U′, socket S, and vertical lifting-rod, substantially as described, and for the purposes set forth.

6. The combination, with a transom-window, of the guide U′, guide-socket S, vertical lifting-rod U, and connecting rod or arm L, and suitable transom-connections, all substantially as described, and for the purposes set forth.

7. The combination, with the lifting-rod and the means by which it is connected to the transom, of a spring to receive the shock of the window in falling or swinging suddenly, substantially as described, and for the purposes set forth.

8. The stationary upright rod or guide U′, supported on the casing and provided with a spiral spring, I, in combination with the movable upright rod U, having the socket S, arranged at or near the junction of said rod with the lifting-arm L, and suitable transom-connections, all substantially as described, and for the purposes set forth.

9. The combination, with a transom lifting-rod and lifting-arm, of a reversible bracket, B′, for connecting the transom with the lifting-arm, substantially as described, and for the purposes set forth.

JOHN F. WOLLENSAK.

Witnesses:
CHARLES C. LINTHICUM,
THOMAS A. BANNING.